United States Patent
Zhang

(10) Patent No.: US 10,714,943 B2
(45) Date of Patent: *Jul. 14, 2020

(54) POWER MANAGEMENT METHOD, ELECTRONIC DEVICE, AND POWER ADAPTER

(71) Applicant: GUANGDONG OPPO MOBILE TELECOMMUNICATIONS CORP., LTD., Dongguan (CN)

(72) Inventor: Jialiang Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 817 days.

This patent is subject to a terminal disclaimer.

(21) Appl. No.: 15/326,157

(22) PCT Filed: Mar. 27, 2015

(86) PCT No.: PCT/CN2015/075291
§ 371 (c)(1),
(2) Date: Jan. 13, 2017

(87) PCT Pub. No.: WO2016/154817
PCT Pub. Date: Oct. 6, 2016

(65) Prior Publication Data
US 2017/0207647 A1   Jul. 20, 2017

(51) Int. Cl.
*G05D 3/12*   (2006.01)
*G05D 5/00*   (2006.01)
(Continued)

(52) U.S. Cl.
CPC ............ *H02J 7/00* (2013.01); *G01K 3/14* (2013.01); *G05B 13/024* (2013.01); *H02H 5/04* (2013.01);
(Continued)

(58) Field of Classification Search
CPC .... H02J 7/04; G01K 3/14; H02H 5/04; H02H 7/18
(Continued)

(56) References Cited

U.S. PATENT DOCUMENTS 7,907,062 B2   3/2011   Feliss et al.
8,339,760 B2   12/2012  Rabu et al.
(Continued)

FOREIGN PATENT DOCUMENTS

CN   101820177   9/2010
CN   102196942   9/2011
(Continued)

OTHER PUBLICATIONS

US 8,878,496 B1, 11/2014, Oku (withdrawn)
(Continued)

*Primary Examiner* — Md Azad
(74) *Attorney, Agent, or Firm* — Hodgson Russ LLP

(57) ABSTRACT

Embodiments of the present invention provide a power management method, an electronic device and a power adapter, capable of improving the charge safety. The method is executed in an electronic device charged by a power adapter via a charge cable. The method includes: determining a temperature of a charging interface, in which the charging interface includes at least one of an interface of the power adapter for electric connection with the charging cable, an interface of the charging cable for electric connection with the power adapter, an interface of the charging cable for electric connection with the electronic device, and an interface of the electronic device for electric connection with the charging cable; and managing power of the electronic device according to the temperature of the charging interface.

15 Claims, 2 Drawing Sheets

(51) Int. Cl.
*G05D 9/00* (2006.01)
*G05D 11/00* (2006.01)
*G05D 17/00* (2006.01)
*H02J 7/00* (2006.01)
*H02H 7/18* (2006.01)
*H02J 7/04* (2006.01)
*H02H 5/04* (2006.01)
*G01K 3/14* (2006.01)
*G05B 13/02* (2006.01)

(52) U.S. Cl.
CPC ......... *H02H 7/18* (2013.01); *H02J 7/007192* (2020.01); *H02J 7/04* (2013.01); *H02J 7/0029* (2013.01); *H02J 2207/20* (2020.01)

(58) Field of Classification Search
USPC ........................................................ 700/295
See application file for complete search history.

(56) References Cited

U.S. PATENT DOCUMENTS

| | | | |
|---|---|---|---|
| 8,981,731 | B1 | 3/2015 | Oku |
| 2003/0080713 | A1* | 5/2003 | Kirmuss ................. B60R 11/02 320/150 |
| 2006/0082346 | A1 | 4/2006 | Nagasawa |
| 2006/0219448 | A1 | 10/2006 | Grieve et al. |
| 2008/0290731 | A1 | 11/2008 | Cassidy |
| 2009/0195237 | A1 | 8/2009 | Feliss et al. |
| 2010/0181966 | A1 | 7/2010 | Sakakibara |
| 2010/0277130 | A1 | 11/2010 | Tsuji |
| 2010/0315752 | A1* | 12/2010 | Rabu ................. H01R 13/6683 361/103 |
| 2011/0204849 | A1 | 8/2011 | Mukai et al. |
| 2012/0212179 | A1 | 8/2012 | Nathan et al. |
| 2012/0294332 | A1 | 11/2012 | Monks et al. |
| 2013/0123999 | A1* | 5/2013 | Pereira ............... G05D 23/1924 700/295 |
| 2014/0035527 | A1 | 2/2014 | Hayashigawa et al. |
| 2014/0091759 | A1 | 4/2014 | Kagawa et al. |
| 2014/0203777 | A1 | 7/2014 | Flack |
| 2015/0048804 | A1 | 2/2015 | Toivanen et al. |
| 2015/0123616 | A1 | 5/2015 | Oku |
| 2015/0171646 | A1 | 6/2015 | Pham et al. |
| 2015/0180221 | A1 | 6/2015 | Leinonen et al. |
| 2015/0288201 | A1 | 10/2015 | Hatakeyama et al. |
| 2015/0346792 | A1* | 12/2015 | Rathi .................... G06F 1/266 713/310 |
| 2016/0072341 | A1 | 3/2016 | Tamura et al. |
| 2016/0121735 | A1 | 5/2016 | Sugano |
| 2016/0257218 | A1* | 9/2016 | Flack ....................... B60L 3/04 |

FOREIGN PATENT DOCUMENTS

| | | |
|---|---|---|
| CN | 102651526 | 8/2012 |
| CN | 102737797 A | 10/2012 |
| CN | 202474958 U | 10/2012 |
| CN | 103208659 | 7/2013 |
| CN | 103296721 A | 9/2013 |
| CN | 203445596 | 2/2014 |
| CN | 104377751 | 2/2015 |
| CN | 104767180 | 7/2015 |
| EP | 2387126 A1 | 11/2011 |
| JP | 2002352635 | 12/2002 |
| JP | 2009093826 | 4/2009 |
| JP | 2011114955 A | 6/2011 |
| JP | 5467553 | 4/2014 |

OTHER PUBLICATIONS

ISA/CN, International Search Report for PCT/CN2015/075291, dated Dec. 28, 2015.
Intellectual Property Office of Singapore, Search Report for SG Application 11201700719, dated Oct. 30, 2017.
European Patent Office, Supplementary Search Report for EP Application 15886804, dated Jan. 16, 2018.
JPO, First Office Action for JP Application No. 2017534866, dated Feb. 13, 2018.
JPO, Second Office Action for JP Application No. 2017534866, dated Apr. 20, 2018.
APO, Office Action for AU Application No. 2015389286, dated May 4, 2018.
SIPO, First Office Action for CN Application No. 201810502445.8, dated Aug. 19, 2019.
SIPO, First Office Action for CN Application No. 201580004887.4, dated Jul. 20, 2017.
SIPO, First Office Action for CN Application No. 201580004888.9, dated Jul. 25, 2017.
WIPO, ISR for PCT/CN2015/075295, Dec. 31, 2015.
WIPO, ISR for PCT/CN2015/075310, Jan. 4, 2016.
USPTO, Office Action for U.S. Appl. No. 15/371,383, dated Jun. 13, 2019.
USPTO, Office Action for U.S. Appl. No. 15/371,383, dated Dec. 12, 2018.
USPTO, Office Action for U.S. Appl. No. 15/371,390, dated Dec. 10, 2018.
EPO, Office Action for EP Application No. 15886806.7, dated Oct. 24, 2017.
EPO, Office Action for EP Application No. 18198005.3, dated Nov. 20, 2018.
IPO, Office Action for IN Application No. 201637041717, dated May 28, 2019.
IPO, Office Action for in Application No. 201637041716, dated Jun. 6, 2019.

* cited by examiner

100 determining a temperature of a charging interface, in which the charging interface includes at least one of an interface of the power adapter for electric connection with the charging cable, an interface of the charging cable for electric connection with the power adapter, an interface of the charging cable for electric connection with the electronic device, and an interface of the electronic device for electric connection with the charging cable — S110 managing power of the electronic device according to the temperature of the charging interface — S120

Fig. 1

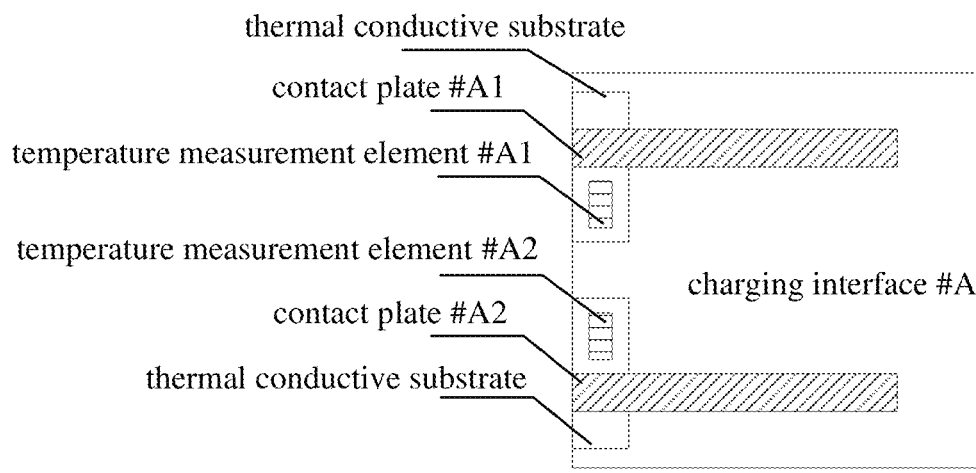

Fig. 2

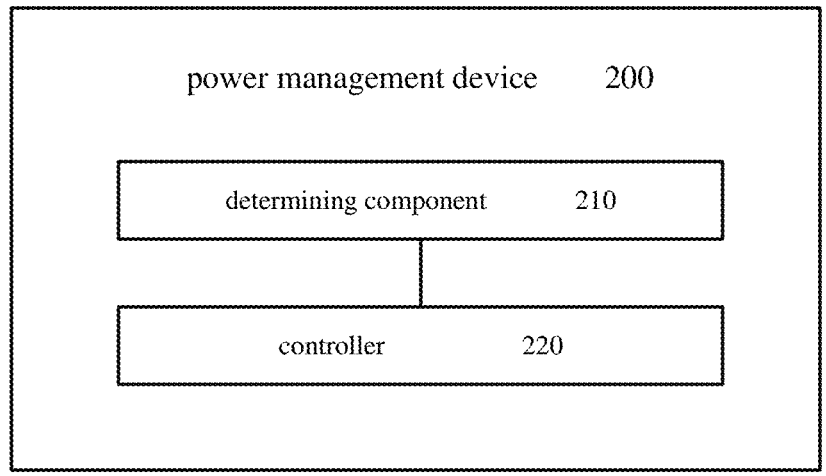

Fig. 3

POWER MANAGEMENT METHOD, ELECTRONIC DEVICE, AND POWER ADAPTER

CROSS-REFERENCE TO RELATED APPLICATIONS

This application is a continuation application of an International Application No. PCT/CN2015/075291, filed on Mar. 27, 2015, the entire contents of which are incorporated herein by reference.

TECHNICAL FIELD

The present disclosure generally relates to a charging technical field, and more particularly, to a power management method, an electronic device and a power adapter.

BACKGROUND

Nowadays, an electronic device such as a mobile phone is generally provided with a rechargeable battery, such that the battery can be charged by a power adapter.

During charging, the power adapter converts an alternating current to a direct current having a specified voltage and transmits the direct current to the electronic device. Moreover, the power adapter and the electronic device are generally provided with electronic interfaces, via which the power adapter and the electronic device can be coupled with a charging cable, and thus the charging can be performed via the charging cable.

However, the above electric connection between electronic interfaces relies on contact between contact plates made of metal. When the charging current flows through the contact plate, the contact plate generates heat due to heat effect of a resistor thereof. When the charging current or charging voltage is too large, component damage or even explosion may occur due to excessively high temperature of the electronic interface, which seriously affects use safety.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

FIG. 1 is a flow chart of a power management method according to an embodiment of the present disclosure.

FIG. 2 is a schematic diagram showing a dispositional relation of a temperature measurement element and an electronic interface according to an embodiment of the present disclosure.

FIG. 3 is a block diagram of a power management device according to an embodiment of the present disclosure.

DETAILED DESCRIPTION

Figure 4:
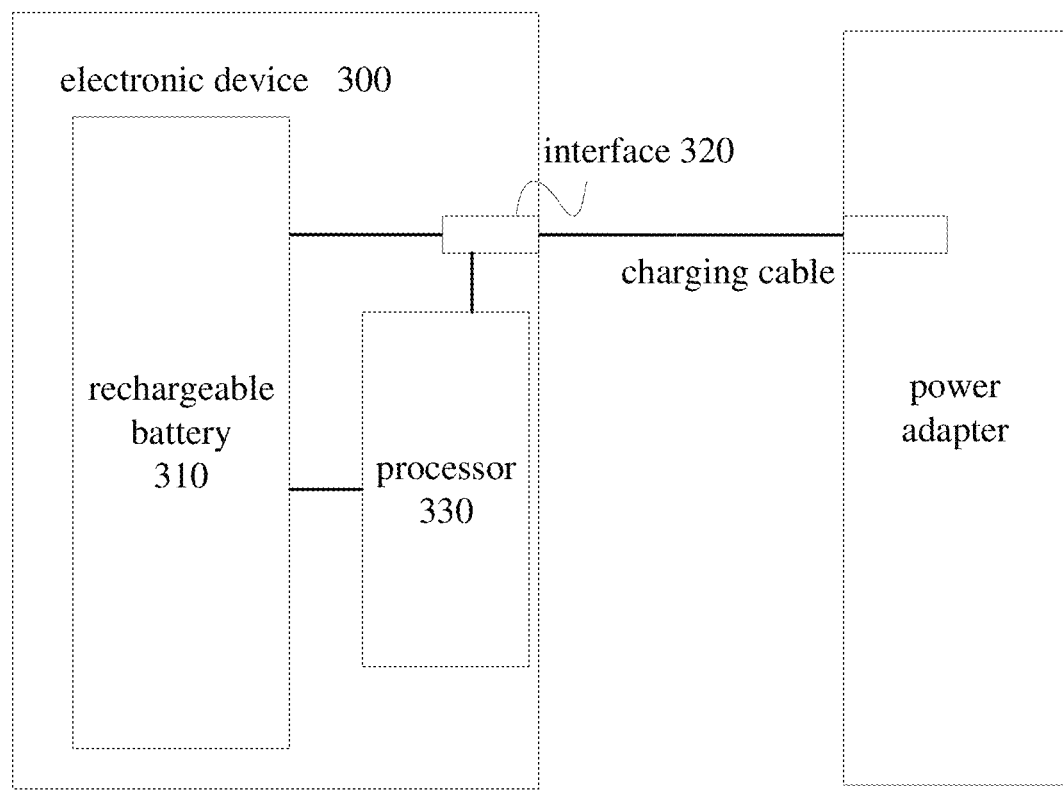
FIG. 4 is a block diagram of an electronic device according to an embodiment of the present disclosure.

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

FIG. 1 is a flow chart of a power management method 100 according to an embodiment of the present disclosure. The method 100 is applied in an electronic device charged by a power adapter via a charging cable, that is, an execution body of the method 100 may be the electronic device. As illustrated in FIG. 1, the method 100 may include following acts.

At block S110, a temperature of a charging interface is determined. The charging interface includes at least one of following interfaces: an interface of the power adapter for electric connection with the charging cable, an interface of the charging cable for electric connection with the power adapter, an interface of the charging cable for electric connection with the electronic device, and an interface of the electronic device for electric connection with the charging cable.

At block S120, power of the electronic device is managed according to the temperature of the charging interface.

In an embodiment of the present disclosure, the method 100 is applied to a charging system performing the charging by establishing the electric connection via the charging interfaces.

For example, in the charging system, the power adapter, the charging cable and the electronic device (for example, a mobile phone and the like) are independent from each other. In this case, the charging interfaces may include following interfaces:

A. the interface of the electronic device for electric connection with the charging cable, referred to as interface #A hereinafter for convenience of understanding and distinguishing;

B. the interface of the charging cable for electric connection with the power adapter, referred to as interface #B hereinafter for convenience of understanding and distinguishing.

C. the interface of the charging cable for electric connection with the electronic device, referred to as interface #C hereinafter for convenience of understanding and distinguishing.

D. the interface of the power adapter for electric connection with the charging cable, referred to as interface #D hereinafter for convenience of understanding and distinguishing.

As another example, in the charging system, the electronic device and the charging cable can be integrated. In this case, the charging interfaces may include only the interface #D and the interface #B.

As another example, in the charging system, the power adapter and the charging cable can be integrated. In this case, the charging interfaces may include only the interface #C and the interface #A.

Thus, in an embodiment of the present disclosure, at block S110, the electronic device may determine the temperature of at least one of the interface #A~the interface #D. In the following, the process of determining the temperature of respective interface is explained in detail.

1. The Process of Determining the Temperature of Interface #A

In an embodiment of the present disclosure, when the charging interface includes the interface of the electronic device for electric connection with the charging cable, determining the temperature of the charging interface includes:

determining the temperature of the charging interface by a first temperature measurement element disposed in the interface of the electronic device.

In an embodiment of the present disclosure, a temperature measurement element for measuring the temperature of the interface #A (i.e., an example of the first temperature measurement element, referred to as temperature measurement element #A hereinafter for convenience of understanding and distinguishing) may be disposed in the electronic device.

Thus, the electronic device can detect the temperature of the interface #A by the temperature measurement element #A.

In an embodiment of the present disclosure, determining the temperature of the charging interface by the first temperature measurement element disposed in the interface of the electronic device includes:

detecting a temperature of at least one contact plate in the interface of the electronic device by at least one first temperature measurement element disposed in the interface of the electronic device, in which there is a one-to-one correspondence between the at least one contact plate and the at least one first temperature measurement element, and the contact plate is configured to transmit charging current; and determining the temperature of the charging interface according to the temperature of the at least one contact plate.

In an embodiment of the present disclosure, FIG. 2 illustrates a schematic diagram of a dispositional relation of the temperature measurement element and the charging interfaces. As illustrated in FIG. 2, a plurality of contact plates made of metal may be disposed in the interface #A (for example, the tongue of the interface #A). Moreover, although not shown in the drawings, a plurality of contact plates made of metal may also be disposed in the interface #C (for example, the tongue of the interface #C). Furthermore, in general, the plurality of contact plates in the interface #A have a one-to-one correspondence (for example, position correspondence) with the plurality of contact plates in the interface #C. Thus, when the interface #A is coupled with the interface #C, each contact plate in the interface #A contacts the corresponding contact plate in the interface #C, thereby realizing the electric connection between the electronic device and the charging cable.

Since the contact plate is a heat source, in an embodiment of the present disclosure, the temperature measurement element #A can detect the temperature of the contact plates in the interface #A, and then the temperature of the interface #A can be determined according to the temperature of the contact plates in the interface #A.

For example, in an embodiment of the present disclosure, different types of temperature sensors can be selected as the temperature measurement element #A according to the configuration space of the interface #A. For example, a thermistor can be used as the temperature measurement element #A.

In an embodiment of the present disclosure, there may be one or more temperature measurement elements #A, which is not limited in the present disclosure. In order to ensure the accuracy of the measurement, one temperature measurement element #A only corresponds to one contact plate, or one temperature measurement element #A is used to measure the temperature of only one contact plate.

In an embodiment of the present disclosure, at least two temperature measurement elements are disposed in the interface of the electronic device, and the at least two temperature measurement elements have a one-to-one correspondence with the at least two contact plates in the interface of the electronic device.

In an embodiment of the present disclosure, the number of the temperature measurement elements #A can be determined according to the number of the contact plates of the interface #A. For example, the number of the contact plates of the interface #A is equal to the number of the temperature measurement elements #A, such that the temperature of each contact plate can be measured by the corresponding temperature measurement element, thereby acquiring the temperature of all the contact plates in the interface #A.

For example, as illustrated in FIG. 2, when there are two contact plates for transmitting current in the interface #A (hereinafter, for convenience of understanding and distinguishing, the two contact plates are denoted as the contact plate #A1 and the contact plate #A2), two temperature measurement elements can be provided (hereinafter, for convenience of understanding and distinguishing, denoted as the temperature measurement element #A1 and the temperature measurement element #A2), in which the temperature measurement element #A1 is corresponding to the contact plate #A1 and is configured to measure the temperature of the contact plate #A1, and the temperature measurement element #A2 is corresponding to the contact plate #A2 and is configured to measure the temperature of the contact plate #A2.

In the following, the configuration relation of the temperature measurement elements #A and the contact plates of the interface #A is explained in detail.

In an embodiment of the present disclosure, when there are a plurality of temperature measurement elements #A, respective temperature measurement elements #A and the corresponding contact plates may have a same or similar configuration. For simplicity, explanation is made by taking the configuration of the temperature measurement element #A1 and the contact plate #A1 illustrated in FIG. 2 as an example.

For example, in an embodiment of the present disclosure, the temperature measurement element #A1 may be directly attached to the surface of the contact plate #A1.

As another example, in an embodiment of the present disclosure, each first temperature measurement element and the corresponding contact plate are disposed on a same thermal conductive substrate, and each first temperature measurement element has a preset spacing with the corresponding contact plate.

In an embodiment of the present disclosure, as illustrated in FIG. 2, the temperature measurement element #A1 and the contact plate #A1 can be disposed on the same thermal conductive substrate, such that the heat of the contact plate #A1 can be transferred to the temperature measurement element #A1 via the thermal conductive substrate, and moreover there may be a preset spacing a between the contact plate #A1 and the temperature measurement element #A1, and the size of the spacing $\alpha$ can be adjusted according to the size and the configuration of the interface A. By setting the spacing $\alpha$, it can avoid influence of the current flowing through the contact plate #A1 to the temperature measurement element #A1 due to the direct contact.

In an embodiment of the present disclosure, the thermal conductive substrate is made of metal.

In an embodiment of the present disclosure, in order to improve the thermal conductivity of the thermal conductive substrate, preferably, the thermal conductive substrate is made of metal, and moreover the thickness of the thermal conductive substrate may be as small as possible, thereby further improving the thermal conductivity. For example, the copper foil can be used as the thermal conductive substrate.

In an embodiment of the present disclosure, an insulating thermal conductive layer is disposed between the first temperature measurement element and the thermal conductive substrate, or an insulating thermal conductive layer is disposed between the contact plate corresponding to the first temperature measurement element and the thermal conductive substrate.

In an embodiment of the present disclosure, since current flows through the contact plate #A1 of the interface #A when the electronic device is charged, the current may be transported from the contact plate #A1 to the temperature measurement element #A1 via the thermal conductive substrate when the thermal conductive substrate is made of metal, and the flowing-in current transported from the contact plate #A1 via the thermal conductive substrate may affect the temperature measurement element #A1 when an electronic element such as a thermistor or an electronic temperature sensor is used as the temperature measurement element #A1. By disposing the insulation layer between the temperature measurement element #A1 and the thermal conductive substrate, or by disposing the insulation layer between the contact plate #A1 and the thermal conductive substrate, it can prevent the temperature measurement element #A1 from being affected by the current while conducting heat, thereby improving the safety and reliability of the battery assembly of the present disclosure.

It can be understood that, the listed material and shape of the thermal conductive substrate are merely used for explanation, and the present disclosure is not limited thereto, as long as the heat can be transported to the temperature measurement element from the contact plate. For example, a PCB (Printed Circuit Board) having a thermal conductive layer on the surface thereof may be used as the thermal conductive substrate.

In an embodiment of the present disclosure, determining the temperature of the charging interface by the first temperature measurement element disposed in the interface of the electronic device includes:

detecting the temperature of the corresponding contact plate by the first temperature measurement element within at least two time periods, so as to determine at least two temperature values, in which the at least two temperature values have a one-to-one correspondence with the at least two time periods; and averaging processing the at least two temperature values to determine the temperature of the charging interface.

In an embodiment of the present disclosure, for any temperature measurement element (for convenience of understanding, the temperature measurement element #A1 is used as an example), it can measure the temperature of the contact plate #A1 many times (i.e., within at least two time periods) in one temperature measurement cycle, such that multiple temperature values of the contact plate #A1 at different time points (herein, the multiple temperature values may be same or different, which is not limited in the present disclosure) can be determined.

Thus, an averaging processing may be performed on the multiple temperature values, for example, an arithmetic mean value may be calculated and used as the temperature value of the contact plate #A1.

It can be understood that, the listed implementation of the averaging processing is merely illustrative, and the present disclosure is not limited thereto.

In addition, the listed process of determining the temperature of the contact plate of the interface #A is merely illustrative, and the present disclosure is not limited thereto. For example, it is possible to obtain only one temperature message transmitted by the temperature measurement element #A, and use the unique temperature value as the temperature of the contact plate of the interface #A, or it is possible to use a maximum of multiple temperature values as the temperature of the contact plate of the interface #A after multiple temperature messages transmitted by the temperature measurement element #A are received.

In an embodiment of the present disclosure, determining the temperature of the charging interface by the first temperature measurement element disposed in the interface of the electronic device includes:

obtaining at least two temperature values by at least two temperature measurement elements, and averaging processing the at least two temperature values to determine the temperature of the charging interface, in which the at least two temperature measurement elements are one-to-one corresponding to the at least two temperature values.

In an embodiment of the present disclosure, when a plurality of temperature measurement elements are disposed, an averaging processing can be performed on the temperature values of the contact plate measured by respective temperature measurement elements, and the obtained average temperature value is used as the temperature value of the contact plate.

In an embodiment of the present disclosure, after the temperature of the contact plate is obtained, the temperature of the contact plate can be directly used as the temperature of the interface #A. Or, a suitable processing can be performed on the temperature of the contact plate, for example, a preset value can be subtracted from the temperature of the contact plate, and a final result is used as the temperature of the interface #A, which is not limited in the present disclosure. Other methods of determining the temperature of the interface according to the temperature of the contact plate fall within the scope of the present disclosure.

It can be understood that, the listed configuration methods and measurement objects of the temperature measurement element #A are merely illustrative, and the present disclosure is not limited thereto. For example, the temperature measurement element #A can be configured on a housing of the interface #A for measuring the temperature of the housing of the interface #A, and the temperature of the housing of the interface #A is used as the temperature of the interface #A.

2. The Process of Determining the Temperature of the Interface #B

In an embodiment of the present disclosure, when the charging interface includes the interface of the charging cable for electric connection with the power adapter, determining the temperature of the charging interface includes:

receiving first temperature indication information indicating a temperature of the interface of the charging cable for electric connection with the power adapter sent by the charging cable, in which the temperature of the interface of the charging cable for electric connection with the power adapter is detected by a second temperature measurement element disposed in the interface of the charging cable for electric connection with the power adapter; and determining the temperature of the charging interface according to the first temperature indication information.

In an embodiment of the present disclosure, a temperature measurement element for measuring the temperature of the interface #B (i.e., an example of the second temperature measurement element, referred to as the temperature measurement element #B hereinafter for convenience of understanding and distinguishing) can be disposed in the charging cable.

Thus, the charging cable can detect the temperature of the interface #B via the temperature measurement element #B.

Moreover, in an embodiment of the present disclosure, the configuration methods and measurement objects of the temperature measurement element #B in the interface #B can be similar to those of the temperature measurement element #A in the interface #A, which is not elaborated herein for simplicity of description.

Then, the charging cable can send the information indicating the temperature of the interface #B (i.e., an example of the first temperature indication information) to the electronic device, such that the electronic device can determine the temperature of the interface #B according to the first temperature indication information.

3. The Process of Determining the Temperature of the Interface #C

In an embodiment of the present disclosure, when the charging interface includes the interface of the charging cable for electric connection with the electronic device, determining the temperature of the charging interface includes:

receiving second temperature indication information indicating a temperature of the interface of the charging cable for electric connection with the electronic device sent by the charging cable, in which the temperature of the interface of the charging cable for electric connection with the electronic device is detected by a third temperature measurement element disposed in the interface of the charging cable for electric connection with the electronic device; and determining the temperature of the charging interface according to the second temperature indication information.

In an embodiment of the present disclosure, a temperature measurement element for measuring the temperature of the interface #C (i.e., an example of the third temperature measurement element, referred to as the temperature measurement element #C hereinafter for convenience of understanding and distinguishing) can be disposed in the charging cable.

Thus, the charging cable can detect the temperature of the interface #C via the temperature measurement element #C.

Moreover, in an embodiment of the present disclosure, the configuration methods and measurement objects of the temperature measurement element #C in the interface #C are similar to those of the temperature measurement element #A in the interface #A, which is not elaborated herein for simplicity of description.

Then, the charging cable can send the information for indicating the temperature of the interface #C (i.e., an example of the second temperature indication information) to the electronic device, such that the electronic device can determine the temperature of the interface #C according to the second temperature indication information.

4. The Process of Determining the Temperature of the Interface #D

In an embodiment of the present disclosure, when the charging interface includes the interface of the power adapter for electric connection with the charging cable, determining the temperature of the charging interface includes:

receiving third temperature indication information indicating a temperature of the interface of the power adapter sent by the power adapter via the charging cable, in which the temperature of the interface of the power adapter is detected by a fourth temperature measurement element disposed in the interface of the power adapter; and determining the temperature of the charging interface according to the third temperature indication information.

In an embodiment of the present disclosure, a temperature measurement element for measuring the temperature of the interface #D (i.e., an example of the fourth temperature measurement element, referred to as the temperature measurement element #D hereinafter for convenience of understanding and distinguishing) can be disposed in the power adapter.

Thus, the power adapter can detect the temperature of the interface #D via the temperature measurement element #D.

Moreover, in an embodiment of the present disclosure, the configuration methods and measurement objects of the temperature measurement element #D in the interface #D are similar to those of the temperature measurement element #A in the interface #A, which is not elaborated herein for simplicity of description.

Then, the power adapter can send the information for indicating the temperature of the interface #D (i.e., an example of the third temperature indication information) to the electronic device via the charging cable, such that the electronic device can determine the temperature of the interface #D according to the third temperature indication information.

With the above methods, the electronic device can determine the temperature of at least one interface of the interface #A~the interface #D, and then at block S120, the electronic device can manage the power thereof according to the temperature determined at block S110.

In an embodiment of the present disclosure, managing power of the electronic device according to the temperature of the charging interface includes:

when the temperature of the charging interface is greater than or equal to a first temperature threshold, sending an instruction to the power adapter via the charging cable for instructing the power adapter to reduce a current value of the charging current or reduce a voltage value of the charging current; or when the temperature of the charging interface is greater than or equal to a second temperature threshold, forbidding charging a rechargeable battery in the electronic device or forbidding providing power to electronic components of the electronic device, in which the second temperature threshold is greater than the first temperature threshold.

In an embodiment of the present disclosure, when the electronic device can determine the temperature of one interface of the interface #A~the interface #D, the control processing can be performed with respect to the charging according to the temperature of the interface.

Or, when the electronic device can determine the temperatures of multiple interfaces of the interface #A~the interface #D, the control processing with respect to the charging can be performed according to the maximum of the multiple temperatures, or the control processing with respect to the charging can be performed according to the average value of the multiple temperatures, or the control processing with respect to the charging can be performed according to the minimum of the multiple temperatures, which is not limited herein.

Hereinafter, the temperature used for the control processing with respect to the charging is referred to as "the temperature of the charging interface".

For example, when the temperature of the charging interface is greater than or equal to the first temperature threshold, it indicates that there is safety risk in the charging system, and thus the electronic device can inform the power adapter to reduce the charging voltage or reduce the charging current, thereby reducing the heating value of the charging interface. Moreover, the first temperature threshold may be a safe temperature threshold at which a quick charging (for example, large current charging or large voltage charging) can be performed, for example, the first temperature threshold may be any value from 15° C. to 45° C.

For example, when the temperature of the charging interface is greater than or equal to the second temperature threshold and the second temperature threshold is greater than the first temperature threshold, it indicates that the charging system is not suitable for continuing its work, and thus the electronic device can cut off the charging circuit, or the electronic device can cut off the power supply circuit for supplying power to the electronic elements of the electronic device from the battery. Moreover, the second temperature threshold may be a safe temperature threshold at which the charging can be performed, for example, the second temperature threshold may be 50° C.

It can be understood that, the listed specific values of respective temperature thresholds are merely illustrative, and the present disclosure is not limited thereto. For example, the specific values of respective temperature thresholds can be determined according to the safe working temperature and maximum allowable temperature of respective element and component (for example, the power adapter, the charging cable and the electronic device) of the charging system, or according to values set by the user (for example, values set by the user according to the tolerance degree to the heat).

In addition, the listed embodiments of managing power by the electronic device according to the temperature of the charging interface are merely illustrative, and the present disclosure is not limited thereto. In a case that the power adapter or the charging cable has a function of controlling the charging, the electronic device can also send the information for indicating the temperature of the interface #A to the charging cable or the power adapter, and the charging is controlled by the charging cable or the power adapter according to the temperature of the interface #A. Herein, the control method and process is similar to that of the electronic device, which is not elaborated for simplicity of description.

In addition, in an embodiment of the present disclosure, any of the interface #A~the interface #D can be configured as the existing USB interface, and the information transmission among the power adapter, the charging cable and the electronic device can be performed via the data transmission lines in the USB interfaces.

According to the power management method of embodiments of the present disclosure, by monitoring the temperature of the charging interface, and controlling the charging based on the temperature of the charging interface, it can support the protection to elements and components by adjusting the charging current or charging voltage or even cutting off the charging circuit when the temperature of the charging interface exceeds the safety temperature, thereby improving the safety of charging.

Hereinbefore, the power management method of embodiments of the present disclosure is explained in detail with reference to FIGS. 1 and 2. Hereinafter, a power management device of embodiments of the present disclosure will be explained in detail with reference to FIG. 3.

FIG. 3 is a block diagram of a power management device 200 according to an embodiment of the present disclosure. The device 200 is applied in an electronic device charged by a power adapter via a charging cable, and as illustrated in FIG. 3, the device 200 includes a determining component 210 and a controller 220.

The determining component 210 is configured to determine a temperature of a charging interface, in which the charging interface includes at least one of an interface of the power adapter for electric connection with the charging cable, an interface of the charging cable for electric connection with the power adapter, an interface of the charging cable for electric connection with the electronic device, and an interface of the electronic device for electric connection with the charging cable.

The controller 220 is configured to manage power of the electronic device according to the temperature of the charging interface.

In an embodiment of the present disclosure, when the charging interface includes the interface of the electronic device for electric connection with the charging cable, the determining component is configured to determine the temperature of the charging interface by a first temperature measurement element disposed in the interface of the electronic device.

In an embodiment of the present disclosure, the determining component is configured to:

detect a temperature of at least one contact plate in the interface of the electronic device by at least one first temperature measurement element disposed in the interface of the electronic device, in which there is a one-to-one correspondence between the at least one contact plate and the at least one first temperature measurement element, and the contact plate is configured to transmit charging current; and determine the temperature of the charging interface according to the temperature of the at least one contact plate.

In an embodiment of the present disclosure, each first temperature measurement element and the corresponding contact plate are disposed on a same thermal conductive substrate, and each first temperature measurement element has a preset spacing with the corresponding contact plate.

In an embodiment of the present disclosure, the thermal conductive substrate is made of metal.

In an embodiment of the present disclosure, an insulating thermal conductive layer is disposed between the first temperature measurement element and the thermal conductive substrate; or an insulating thermal conductive layer is disposed between the contact plate corresponding to the first temperature measurement element and the thermal conductive substrate.

In an embodiment of the present disclosure, when the charging interface includes the interface of the charging cable for electric connection with the power adapter, the device further includes a receiving component configured to receive first temperature indication information indicating a temperature of the interface of the charging cable for electric connection with the power adapter sent by the charging cable, in which the temperature of the interface of the charging cable for electric connection with the power adapter is detected by a second temperature measurement element disposed in the interface of the charging cable for electric connection with the power adapter.

The determining component is configured to determine the temperature of the charging interface according to the first temperature indication information.

In an embodiment of the present disclosure, when the charging interface includes the interface of the charging cable for electric connection with the electronic device, the device further includes a receiving component configured to receive second temperature indication information indicating a temperature of the interface of the charging cable for electric connection with the electronic device sent by the charging cable, in which the temperature of the interface of the charging cable for electric connection with the electronic device is detected by a third temperature measurement element disposed in the interface of the charging cable for electric connection with the electronic device.

The determining component is configured to determine the temperature of the charging interface according to the second temperature indication information.

In an embodiment of the present disclosure, when the charging interface includes the interface of the power adapter for electric connection with the charging cable, the device further includes a receiving component configured to receive third temperature indication information indicating a temperature of the interface of the power adapter sent by the power adapter via the charging cable, in which the temperature of the interface of the power adapter is detected by a fourth temperature measurement element disposed in the interface of the power adapter.

The determining component is configured to determine the temperature of the charging interface according to the third temperature indication information.

In an embodiment of the present disclosure, the controller is configured to:

when the temperature of the charging interface is greater than or equal to a first temperature threshold, send an instruction to the power adapter via the charging cable for instructing the power adapter to reduce a current value of charging current or reduce a voltage value of the charging current; or when the temperature of the charging interface is greater than or equal to a second temperature threshold, forbid charging a rechargeable battery in the electronic device or forbid providing power to electronic components of the electronic device, in which the second temperature threshold is greater than the first temperature threshold.

The power management device 200 according to embodiments of the present disclosure may be corresponding to the implementation body of methods of embodiments of the present disclosure (for example, the electronic device or functional components in the electronic device), and respective units (i.e., modules) in the power management device 200 and the operations and/or functions thereof are configured for realizing corresponding processes of the method 100 in FIG. 1, which is not elaborated herein for simplicity.

According to the power management device of embodiments of the present disclosure, the temperature of the charging interface can be monitored, and the charging can be controlled according to the temperature of the charging interface, such that elements and components can be protected by adjusting the charging current or voltage or even cutting off the charging circuit when the temperature of the charging interface exceeds the safety temperature, thereby improving the safety of charging.

Hereinbefore, the power method management according to embodiments of the present disclosure is explained in detail with reference to FIGS. 1 and 2. Hereinafter, the electronic device of embodiments of the present disclosure will be explained in detail with reference to FIG. 4.

FIG. 4 is a block diagram of an electronic device 300 according to an embodiment of the present disclosure. As illustrated in FIG. 4, the electronic device 300 includes a rechargeable battery 310, an interface 320 and a processor 330.

The interface 320 is configured to perform an electric connection with a charging cable, to acquire direct current from a power adapter via the charging cable, and to charge the rechargeable battery by using the direct current.

The processor 330 is configured to determine a temperature of a charging interface, and to control the interface or the rechargeable battery of the electronic device according to the temperature of the charging interface, so as to manage power of the electronic device, in which, the charging interface includes at least one of an interface of the power adapter for electric connection with the charging cable, an interface of the charging cable for electric connection with the power adapter, an interface of the charging cable for electric connection with the electronic device, and the interface of the electronic device.

In an embodiment of the present disclosure, when the charging interface includes the interface of the electronic device, the electronic device further includes a first temperature measurement element disposed in the interface of the electronic device and configured to determine a temperature of the interface of the electronic device. The processor is configured to determine the temperature of the charging interface according to the temperature of the interface of the electronic device determined by the first temperature measurement element.

In an embodiment of the present disclosure, there is at least one first temperature measurement element, each temperature measurement element is configured to detect a temperature of at least one contact plate in the interface of the electronic device, there is a one-to-one correspondence between the at least one first temperature measurement element and the at least one contact plate, and the contact plate is configured to transmit charging current. The processor is configured to determine the temperature of the charging interface according to the temperature of the at least one contact plate.

In an embodiment of the present disclosure, each first temperature measurement element and the corresponding contact plate are disposed on a same thermal conductive substrate, and each first temperature measurement element has a preset spacing with the corresponding contact plate.

In an embodiment of the present disclosure, the thermal conductive substrate is made of metal.

In an embodiment of the present disclosure, an insulating thermal conductive layer is disposed between the first temperature measurement element and the thermal conductive substrate; or an insulating thermal conductive layer is disposed between the contact plate corresponding to the first temperature measurement element and the thermal conductive substrate.

In an embodiment of the present disclosure, when the charging interface includes the interface of the charging cable for electric connection with the power adapter, the electronic device further includes a receiver configured to receive first temperature indication information indicating a temperature of the interface of the charging cable for electric connection with the power adapter sent by the charging cable, in which the temperature of the interface of the charging cable for electric connection with the power adapter is detected by a second temperature measurement element disposed in the interface of the charging cable for electric connection with the power adapter. The processor is configured to determine the temperature of the charging interface according to the first temperature indication information.

In an embodiment of the present disclosure, when the charging interface includes the interface of the charging cable for electric connection with the electronic device, the electronic device further includes a receiver configured to receive second temperature indication information indicating a temperature of the interface of the charging cable for electric connection with the electronic device sent by the charging cable, in which the temperature of the interface of the charging cable for electric connection with the electronic device is detected by a third temperature measurement element disposed in the interface of the charging cable for electric connection with the electronic device. The processor is configured to determine the temperature of the charging interface according to the second temperature indication information.

In an embodiment of the present disclosure, when the charging interface includes the interface of the power adapter for electric connection with the charging cable, the electronic device further includes a receiver configured to receive third temperature indication information indicating a temperature of the interface of the power adapter sent by the power adapter via the charging cable, in which the temperature of the interface of the power adapter is detected by a fourth temperature measurement element disposed in the interface of the power adapter. The processor is configured to determine the temperature of the charging interface according to the third temperature indication information.

In an embodiment of the present disclosure, the processor is configured to: when the temperature of the charging interface is greater than or equal to a first temperature threshold, send an instruction to the power adapter via the charging cable for instructing the power adapter to reduce a current value of charging current or reduce a voltage value of the charging current; or, when the temperature of the charging interface is greater than or equal to a second temperature threshold, forbid charging a rechargeable battery in the electronic device or forbid providing power to electronic components of the electronic device, in which the second temperature threshold is greater than the first temperature threshold.

Figure 5:
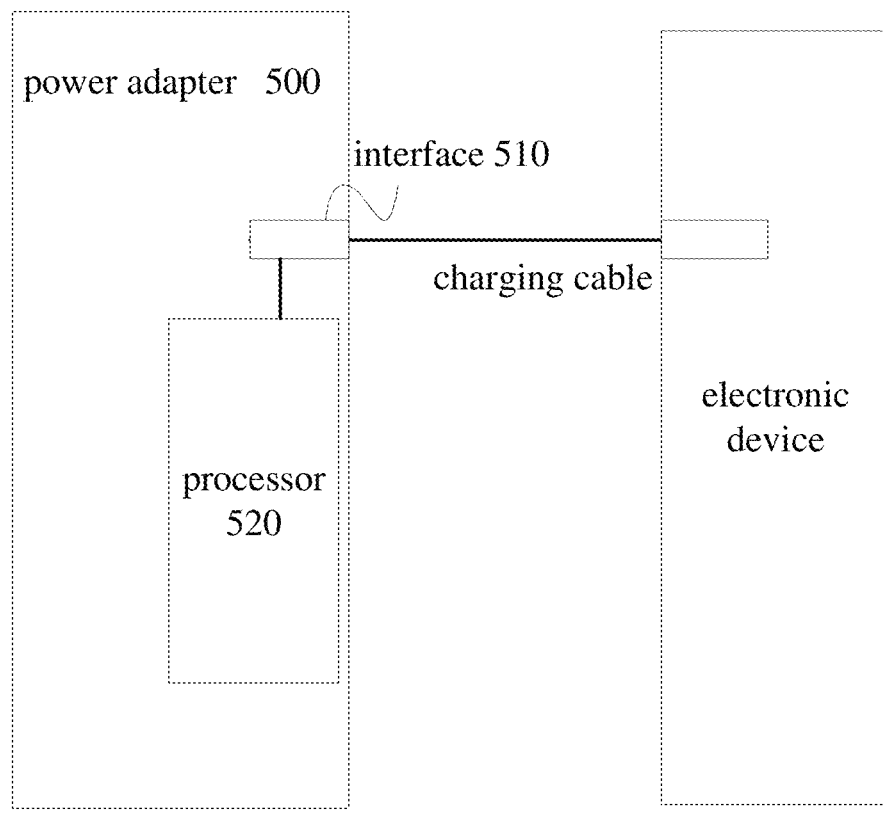
FIG. 5 is a block diagram of a power adapter according to an embodiment of the present disclosure.

FIG. 5 is a block diagram of a power adapter 500 according to an embodiment of the present disclosure. As illustrated in FIG. 5, the power adapter 500 includes an interface 510 and a processor 520.

The interface 510 is configured to perform an electric connection with a charging cable, to output charging current to an electronic device via the charging cable.

The processor 520 is configured to determine a temperature of a charging interface, and to control a charging to the electronic device according to the temperature of the charging interface, in which, the charging interface includes at least one of the interface of the power adapter, an interface of the charging cable for electric connection with the power adapter, an interface of the charging cable for electric connection with the electronic device, and an interface of the electronic device for electric connection with the charging cable.

In an embodiment of the present disclosure, when the charging interface includes the interface of the power adapter, the power adapter further includes a first temperature measurement element, disposed in the interface of the power adapter, and configured to determine a temperature of the interface of the power adapter. The processor is configured to determine the temperature of the charging interface according to the temperature of the interface of the power adapter determined by the first temperature measurement element.

In an embodiment of the present disclosure, there is at least one first temperature measurement element, each temperature measurement element is configured to detect a temperature of at least one contact plate in the interface of the power adapter, there is a one-to-one correspondence between the at least one first temperature measurement element and the at least one contact plate, and the contact plate is configured to transmit charging current. The processor is configured to determine the temperature of the charging interface according to the temperature of the at least one contact plate.

In an embodiment of the present disclosure, each first temperature measurement element and the corresponding contact plate are disposed on a same thermal conductive substrate, and each first temperature measurement element has a preset spacing with the corresponding contact plate.

In an embodiment of the present disclosure, the thermal conductive substrate is made of metal.

In an embodiment of the present disclosure, an insulating thermal conductive layer is disposed between the first temperature measurement element and the thermal conductive substrate; or an insulating thermal conductive layer is disposed between the contact plate corresponding to the first temperature measurement element and the thermal conductive substrate.

In an embodiment of the present disclosure, when the charging interface includes the interface of the charging cable for electric connection with the power adapter, the power adapter further includes a receiver configured to receive first temperature indication information indicating a temperature of the interface of the charging cable for electric connection with the power adapter sent by the charging cable, in which the temperature of the interface of the charging cable for electric connection with the power adapter is detected by a second temperature measurement element disposed in the interface of the charging cable for electric connection with the power adapter. The processor is configured to determine the temperature of the charging interface according to the first temperature indication information.

In an embodiment of the present disclosure, when the charging interface includes the interface of the charging cable for electric connection with the electronic device, the power adapter further includes a receiver configured to receive second temperature indication information indicating a temperature of the interface of the charging cable for electric connection with the electronic device sent by the charging cable, in which the temperature of the interface of the charging cable for electric connection with the electronic device is detected by a third temperature measurement element disposed in the interface of the charging cable for electric connection with the electronic device. The processor is configured to determine the temperature of the charging interface according to the second temperature indication information.

In an embodiment of the present disclosure, when the charging interface includes the interface of the electronic device for electric connection with the charging cable, the power adapter further includes a receiver configured to receive third temperature indication information indicating a temperature of the interface of the electronic device sent by the electronic device via the charging cable, in which the temperature of the interface of the electronic device is detected by a fourth temperature measurement element disposed in the interface of the electronic device. The processor is configured to determine the temperature of the charging interface according to the third temperature indication information.

In an embodiment of the present disclosure, the processor is configured to: when the temperature of the charging interface is greater than or equal to a first temperature threshold, reduce a current value of the charging current or reduce a voltage value of the charging current; or, when the temperature of the charging interface is greater than or equal to a second temperature threshold, forbid outputting the charging current, in which the second temperature threshold is greater than the first temperature threshold.

The processor can realize or perform respective steps or logic blocks disclosed in method embodiments of the present disclosure. The processor is a microprocessor or the processor can also be any conventional processor or decoder. Steps of methods disclosed in combination with embodiments of the present disclosure may be directly embodied as being executed by a hardware processor, or completed by a combination of hardware and software modules in the decoding processor. The software modules may be located in storage medium well known in the art, such as a random memory, a flash memory, a read-only memory, a programmable read-only memory, an electrically-erasable programmable memory, or a register.

It can be understood that, in embodiments of the present disclosure, the processor may be a CPU (Central Processing Unit), or any other general processor, DSP (Digital Signal Processor), ASIC (Application Specific Integrated Circuit), FPGA (Field Programmable Gate Array), or any other programmable logic element, separate gate, or transistor logic device or separate hardware component, etc. The general processor may be a microprocessor, or the processor may also be any conventional processor.

The memory may include a read-only memory and a random access memory, and provide instructions and data to the processor. A part of the memory may also include a non-transitory random access memory. For example, the memory may also store the information regarding the device type.

During implementation, respective steps of the above methods can be completed by integrated logic circuits in a hardware form or instructions in a software form in the processor. Steps of methods disclosed in combination with embodiments of the present disclosure may be directly embodied as being executed by a hardware processor, or completed by a combination of hardware and software modules in the processor. The software modules may be located in a storage medium well known in the art, such as a random memory, a flash memory, a read-only memory, a programmable read-only memory, an electrically-erasable programmable memory, or a register. The storage medium is located in a memory, and the processor reads information in the memory, and completes the steps of the above methods in combination with hardware thereof, which is not elaborated herein for simplicity.

The electronic device 300 according to embodiments of the present disclosure can be corresponding to the implementation body of the method of embodiments of the present disclosure, and respective units (i.e., modules) in the electronic device and operations and/or functions thereof are configured for realizing the corresponding processes of the method 100 in FIG. 1, which is not elaborated herein for simplicity.

According to the electronic device of embodiments of the present disclosure, the temperature of the charging interface can be monitored, and the charging can be controlled according to the temperature of the charging interface, such that elements and components can be protected by adjusting the charging current or voltage or even cutting off the charging circuit when the temperature of the charging interface exceeds the safety temperature, thereby improving the safety of charging.

The electronic device according to embodiments of the present disclosure may be any device with a built-in battery and capable of obtaining current from outside to charge the battery, for example, a mobile phone, a tablet PC, a computing device or an information display device.

A mobile phone is taken as an example to illustrate the electronic device applicable in the present disclosure. In embodiments of the present disclosure, the mobile phone can include a radio frequency circuit, a memory, an input unit, a WIFI (Wireless Fidelity) module, a display unit, a sensor, an audio circuit, a processor, a projecting unit, a camera unit, a battery, etc.

The radio frequency circuit can be configured to receive and transmit data in the process of sending and receiving messages or in the communication process, particularly, receive the downlink messages from the base station and send it to the processor for processing, and moreover send uplink data of the mobile phone to the base station. Generally, the radio frequency circuit includes, but is not limited to an antenna, at least one amplifier, a transceiver, a coupler, a low noise amplifier, and a duplexer. In addition, the radio frequency circuit can communicate with the network or other devices via the wireless communication. The above wireless communication can adopt any communication standard or protocol, including but not limited to GSM (Global System for Mobile communication), GPRS (General Packet Radio Service), CDMA (Code Division Multiple Access), WCDMA (Wideband Code Division Multiple Access), LTE (Long Term Evolution), E-mail and SMS (Short Messaging Service).

The memory can be configured to store software programs and modules, and the processor implement various applications and data processing of the mobile phone by running the software programs and modules stored in the memory. The memory can mainly include a program storage area and a data storage area. The program storage area can be configured to store an operating system, application programs required by at least one functions (for example, a voice broadcast function and an image display function), etc. The data storage area can be configured to store data (for example, audio data and contacts) created according to the use of the mobile phone, etc. In addition, the memory can include a high speed random access memory, and can also include a non-transitory memory, for example, at least one magnetic disk memory, flash memory, or any other transitory solid-state memory.

The input unit can be configured to receive inputted number or character information, and to generate key signals associated with user settings and function control of the mobile phone. In detail, the input unit can include a touch panel and any other input device. The touch panel, also referred to as a touch screen, can collect the user's touch operations thereon or nearby (for example, operations of the user on the touch panel or near the touch panel using any suitable object or accessory such as the figure or touch pen) and drive corresponding connected devices according to preset programs. Alternatively, the touch panel can include a touch sensing apparatus and a touch controller. The touch sensing apparatus sense the touch direction of the user and detects the signal generated by the touch operation, and sends the signal to the touch controller. The touch controller receives the touch information from the touch sensing apparatus and converts it to the contact coordinate, and sends the contact coordinate to the processor, and then receives instructions sent from the processor and executes the instructions. In addition, the touch panel can be configured in various types such as a resistance type, a capacitance type, an infrared type, and a surface acoustic wave type. Besides the touch panel, the input unit can also include other inputting devices. In detail, other inputting devices can include but not limited to one or more of a physical keyboard, a function key (for example, a volume control key, an on-off key), a trackball, a mouse, and an operating lever.

The display unit can be configured to display information input by the user or information provided to the user and various menus of the mobile phone. The display unit can includes a display panel, which alternatively can be configured as a LCD (Liquid Crystal Display), an OLED (Organic Light-Emitting Diode). Further, the touch panel can cover the display panel. When the touch panel detects the touch operation thereon or nearby, a message is transmitted to the processor for determining the type of the touch event, and then the processor provides corresponding visual output on the display panel according to the type of the touch event.

The region in the display panel displaying the visual output which can be identified by the user's eyes can be referred to as "display region" hereinafter. The touch panel and the display panel can be configured as two separate components for realizing the input and output functions of the mobile phone. The touch panel and the display panel can be integrated for realizing the input and output functions of the mobile phone.

In addition, the mobile phone can further include at least one sensor, for example, a voltage sensor, a temperature sensor, an attitude sensor, a light sensor, and other sensors.

In detail, the attitude sensor can also be referred to as a sport sensor. As an example of the sport sensor, a gravity sensor can be listed. For the gravity sensor, an elastic sensitive element is adopted to make a cantilever type shifter, and an energy storage spring made of the elastic sensitive element is used to drive electric contacts, such that the gravity change is converted to the change of electric signals.

As another example of the sport sensor, an accelerometer sensor can be listed. The accelerometer sensor can detect an acceleration value in respective directions (generally, three axes) can detect the size and direction of the gravity in a static state, and can identify attitude applications of the mobile phone (for example, switching between landscape mode and vertical screen mode, related games, and attitude calibration of the magnetometer) and functions related to vibration recognition (for example, the pedometer and clicking).

In embodiments of the present disclosure, the above listed sport sensors can be used as elements for obtaining "attitude parameters" hereinafter, but the present disclosure is not limited thereto. Other sensors capable of obtaining "attitude parameters" fall within the scope of the present disclosure, for example, the gyroscope, the working principle and data processing process of which is similar to that in the related art, and will not be elaborated herein for clarity.

In addition, in embodiments of the present disclosure, other sensors such as a barometer, a thermometer, a hygrometer and an infrared sensor can be configured as the sensor, which will not be elaborated herein.

The light sensor can include an environment light sensor and a proximity sensor, in which the environment light sensor can adjust the brightness of the display panel according to light and shade of the environment lights, and the proximity sensor can close the display panel and/or backlight when the mobile phone moves to a position near the ear.

The audio circuit, the microphone and/or the loudspeaker can provide an audio interface between the user and the mobile phone. The audio circuit can convert the received audio data to electric signals, and transmit them to the loudspeaker, such that the loudspeaker convert them to sound signals for outputting. On the other hand, the microphone converts the collected sound signals to electric signals, and the audio circuit receives the electric signals and converts them to audio data, and then output the audio data to the processor for processing. Then, the audio data is sent to another mobile phone by the radio frequency circuit, or the audio data is outputted to the memory for further processing.

WIFI belongs to a short distance wireless transmission technology. The mobile phone can facilitate the user's sending and receiving emails, browsing webpages and accessing streaming medium via the WIFI module, which provides the wireless wideband internet access to the user. In addition, the WIFI module can be omitted according to needs without changing the essence of the present disclosure.

The processor is the control center of the mobile phone, which connects respective components of the whole mobile phone using various interfaces and wires, and executes various functions of the mobile phone and processes data by running or executing software programs and/or modules stored in the memory and calling data stored in the memory, so as to monitor the whole mobile phone. Alternatively, the processor can include one or more processing unit. preferably, an application processor and a modem processor can be integrated in the processor, in which the application processor mainly processes the operating system, the user interface and the applications, and the modem processor mainly processes wireless communication.

It can be understood that, the above modem processor can be not integrated in the processor.

Moreover, the processor can be used as the implementation element of the above processor, and execute same or similar functions of the processing unit.

The mobile phone also includes a power supply (for example, a battery) for supplying power to respective components.

Preferably, the power supply can be logically connected to the processor via the power management system, such that functions such as charging and discharging management and power consumption management can be realized via the power management system. Although not shown, the mobile phone can also include a Bluetooth module, etc. which will not be elaborated herein.

It should be noted that, the mobile phone is merely used as an example of the terminal device, and the present disclosure is not limited thereto. The present disclosure can be applied to any electronic device such as the mobile phone and the tablet PC, which is not limited in the present disclosure.

In embodiments provided by the present disclosure, it can be understood that, the units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

It can be understood that, in various embodiments of the present disclosure, the sequence numbers of respective processes do not refer to the execution order, and the execution sequence of respective processes shall be determined according to the functions and internal logic thereof, which shall not be constituted to limit the implementation of embodiments of the present disclosure.

Those skilled in the art can be aware that, units and algorithm steps in respective examples described with reference to embodiments disclosed in the present disclosure can be realized by electronic hardware or combination of computer software and electronic hardware. Executing these functions in hardware or software depends on particular applications and design constraint conditions of the technical solutions. Technology professionals can use different methods to realize the described functions for each particular application, which should be regarded as being within the scope of the present disclosure.

Those skilled in the art can understand clearly that, for convenience and simplicity of description, specific working process of the above system, devices and units may refer to corresponding process in the above method embodiments, which will not be elaborated herein.

In several embodiments provided by the present disclosure, it should be understood that, the system, devices and method disclosed in several embodiments provided by the present disclosure can be realized in any other manner. For example, the device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A power management method, applied in an electronic device charged by a power adapter via a charging cable, and comprising:
    determining a temperature of a charging interface, including: detecting temperature values of a plurality of contact plates in the charging interface by a plurality of temperature measurement elements within a plurality of time periods, in which the temperature values have a one-to-one correspondence with the plurality of time periods, the plurality of contact plates have a one-to-one correspondence with the plurality of temperature measurement elements, and the plurality of contact plates are configured to transmit charging current; and averaging the temperature values to determine the temperature of the charging interface, wherein the charging interface comprises at least one of an interface of the power adapter for electric connection with the charging cable, an interface of the charging cable for electric connection with the power adapter, an interface of the charging cable for electric connection with the electronic device, and an interface of the electronic device for electric connection with the charging cable; and
    managing power of the electronic device according to the temperature of the charging interface, including: when the temperature of the charging interface is greater than or equal to a first temperature threshold, sending an instruction to the power adapter via the charging cable for instructing the power adapter to reduce a current value of charging current or reduce a voltage value of the charging current, in which the first temperature threshold is between 15° C. and 45° C. at which a charging is allowed to be performed.

2. The method according to claim 1, wherein, when the charging interface comprises the interface of the charging cable for electric connection with the power adapter, determining the temperature of the charging interface comprises:
    receiving first temperature indication information indicating a temperature of the interface of the charging cable for electric connection with the power adapter sent by the charging cable, in which the temperature of the interface of the charging cable for electric connection with the power adapter is detected by a second temperature measurement element disposed in the interface of the charging cable for electric connection with the power adapter; and
    determining the temperature of the charging interface according to the first temperature indication information.

3. The method according to claim 1, wherein, when the charging interface comprises the interface of the charging cable for electric connection with the electronic device, determining the temperature of the charging interface comprises:

receiving second temperature indication information indicating a temperature of the interface of the charging cable for electric connection with the electronic device sent by the charging cable, in which the temperature of the interface of the charging cable for electric connection with the electronic device is detected by a third temperature measurement element disposed in the interface of the charging cable for electric connection with the electronic device; and determining the temperature of the charging interface according to the second temperature indication information.

4. The method according to claim 1, wherein, when the charging interface comprises the interface of the power adapter for electric connection with the charging cable, determining the temperature of the charging interface comprises:

receiving third temperature indication information indicating a temperature of the interface of the power adapter sent by the power adapter via the charging cable, in which the temperature of the interface of the power adapter is detected by a fourth temperature measurement element disposed in the interface of the power adapter; and determining the temperature of the charging interface according to the third temperature indication information.

5. The method according to claim 1, wherein, managing power of the electronic device further comprises:

when the temperature of the charging interface is greater than or equal to a second temperature threshold, forbidding charging a rechargeable battery in the electronic device or forbidding providing power to electronic components of the electronic device, in which the second temperature threshold is greater than the first temperature threshold.

6. An electronic device, comprising:

a rechargeable battery;

an interface, configured to perform an electric connection with a charging cable, to acquire direct current from a power adapter via the charging cable, and to charge the rechargeable battery by using the direct current;

a processor, configured to determine a temperature of a charging interface by detecting temperature values of a plurality of contact plates in the charging interface by a plurality of temperature measurement elements within a plurality of time periods and averaging the temperature values to determine the temperature of the charging interface, and to control the interface or the rechargeable battery of the electronic device according to the temperature of the charging interface, so as to manage power of the electronic device, wherein, the temperature values have a one-to-one correspondence with the plurality of time periods, the plurality of contact plates have a one-to-one correspondence with the plurality of temperature measurement elements, the plurality of contact plates are configured to transmit charging current, the charging interface comprises at least one of an interface of the power adapter for electric connection with the charging cable, an interface of the charging cable for electric connection with the power adapter, an interface of the charging cable for electric connection with the electronic device, and the interface of the electronic device, wherein the processor is configured to: when the temperature of the charging interface is greater than or equal to a first temperature threshold, send an instruction to the power adapter via the charging cable for instructing the power adapter to reduce a current value of charging current or reduce a voltage value of the charging current, in which the first temperature threshold is between 15° C. and 45° C. at which a charging is allowed to be performed.

7. The electronic device according to claim 6, wherein, when the charging interface comprises the interface of the charging cable for electric connection with the power adapter, the electronic device further comprises:

a receiver, configured to receive first temperature indication information indicating a temperature of the interface of the charging cable for electric connection with the power adapter sent by the charging cable, in which the temperature of the interface of the charging cable for electric connection with the power adapter is detected by a second temperature measurement element disposed in the interface of the charging cable for electric connection with the power adapter, wherein the processor is configured to determine the temperature of the charging interface according to the first temperature indication information.

8. The electronic device according to claim 6, wherein, when the charging interface comprises the interface of the charging cable for electric connection with the electronic device, the electronic device further comprises:

a receiver, configured to receive second temperature indication information indicating a temperature of the interface of the charging cable for electric connection with the electronic device sent by the charging cable, in which the temperature of the interface of the charging cable for electric connection with the electronic device is detected by a third temperature measurement element disposed in the interface of the charging cable for electric connection with the electronic device;

wherein the processor is configured to determine the temperature of the charging interface according to the second temperature indication information.

9. The electronic device according to claim 6, wherein, when the charging interface comprises the interface of the power adapter for electric connection with the charging cable, the electronic device further comprises:

a receiver, configured to receive third temperature indication information indicating a temperature of the interface of the power adapter sent by the power adapter via the charging cable, in which the temperature of the interface of the power adapter is detected by a fourth temperature measurement element disposed in the interface of the power adapter;

wherein the processor is configured to determine the temperature of the charging interface according to the third temperature indication information.

10. The electronic device according to claim 6, wherein, the processor is configured to:

when the temperature of the charging interface is greater than or equal to a second temperature threshold, forbid charging a rechargeable battery in the electronic device or forbid providing power to electronic components of the electronic device, in which the second temperature threshold is greater than the first temperature threshold.

11. A power adapter, comprising:

an interface, configured to perform an electric connection with a charging cable, to output charging current to an electronic device via the charging cable; and a processor, configured to determine a temperature of a charging interface by detecting temperature values of a plurality of contact plates in the charging interface by a plurality of temperature measurement elements within a plurality of time periods and averaging the temperature values to determine the temperature of the charging interface, and to control a charging to the electronic device according to the temperature of the charging interface, wherein, the temperature values have a one-to-one correspondence with the plurality of time periods, the plurality of contact plates have a one-to-one correspondence with the plurality of temperature measurement elements, the plurality of contact plates are configured to transmit charging current, the charging interface comprises at least one of the interface of the power adapter, an interface of the charging cable for electric connection with the power adapter, an interface of the charging cable for electric connection with the electronic device, and an interface of the electronic device for electric connection with the charging cable, wherein the processor is configured to: when the temperature of the charging interface is greater than or equal to a first temperature threshold, send an instruction to the power adapter via the charging cable for instructing the power adapter to reduce a current value of charging current or reduce a voltage value of the charging current, in which the first temperature threshold is between 15° C. and 45° C. at which a charging is allowed to be performed.

12. The power adapter according to claim 11, wherein, when the charging interface comprises the interface of the charging cable for electric connection with the power adapter, the power adapter further comprises:

a receiver, configured to receive first temperature indication information indicating a temperature of the interface of the charging cable for electric connection with the power adapter sent by the charging cable, in which the temperature of the interface of the charging cable for electric connection with the power adapter is detected by a second temperature measurement element disposed in the interface of the charging cable for electric connection with the power adapter, wherein the processor is configured to determine the temperature of the charging interface according to the first temperature indication information.

13. The power adapter according to claim 11, wherein, when the charging interface comprises the interface of the charging cable for electric connection with the electronic device, the power adapter further comprises:

a receiver, configured to receive second temperature indication information indicating a temperature of the interface of the charging cable for electric connection with the electronic device sent by the charging cable, in which the temperature of the interface of the charging cable for electric connection with the electronic device is detected by a third temperature measurement element disposed in the interface of the charging cable for electric connection with the electronic device;

wherein the processor is configured to determine the temperature of the charging interface according to the second temperature indication information.

14. The power adapter according to claim 11, wherein, when the charging interface comprises the interface of the electronic device for electric connection with the charging cable, the power adapter further comprises:

a receiver, configured to receive third temperature indication information indicating a temperature of the interface of the electronic device sent by the electronic device via the charging cable, in which the temperature of the interface of the electronic device is detected by a fourth temperature measurement element disposed in the interface of the electronic device;

wherein the processor is configured to determine the temperature of the charging interface according to the third temperature indication information.

15. The power adapter according to claim 11, wherein, the processor is configured to:

when the temperature of the charging interface is greater than or equal to a second temperature threshold, forbid outputting the charging current, in which the second temperature threshold is greater than the first temperature threshold.

* * * * *